(12) United States Patent
Mayer

(10) Patent No.: US 10,040,254 B2
(45) Date of Patent: Aug. 7, 2018

(54) THREE-DIMENSIONAL SURFACE TEXTURING

(71) Applicant: MakerBot Industries, LLC, Brooklyn, NY (US)

(72) Inventor: Adam G. Mayer, Brooklyn, NY (US)

(73) Assignee: MakerBot Industries, LLC, Brooklyn, NY (US)

( * ) Notice: Subject to any disclaimer, the term of this patent is extended or adjusted under 35 U.S.C. 154(b) by 396 days.

(21) Appl. No.: 14/992,200

(22) Filed: Jan. 11, 2016

(65) Prior Publication Data

US 2016/0121551 A1 May 5, 2016

Related U.S. Application Data

(63) Continuation of application No. 14/016,269, filed on Sep. 3, 2013, now Pat. No. 9,238,330, which is a continuation of application No. 13/176,113, filed on Jul. 5, 2011, now Pat. No. 8,529,240.

(51) Int. Cl.
| | |
|---|---|
| *B29C 43/58* | (2006.01) |
| *B29C 67/00* | (2017.01) |
| *B33Y 50/02* | (2015.01) |
| *B33Y 30/00* | (2015.01) |
| *B29C 64/386* | (2017.01) |
| *B29K 101/12* | (2006.01) |

(52) U.S. Cl.
CPC ...... *B29C 67/0088* (2013.01); *B29C 67/0055* (2013.01); *B33Y 30/00* (2014.12); *B33Y 50/02* (2014.12); *B29C 64/386* (2017.08); *B29K 2101/12* (2013.01); *B29K 2995/0072* (2013.01); *B29K 2995/0073* (2013.01)

(58) Field of Classification Search
CPC ....... B33Y 30/00; B33Y 50/02; B29C 64/386; B29C 64/393
USPC .......................................... 700/118, 119, 120
See application file for complete search history.

(56) References Cited

U.S. PATENT DOCUMENTS

| | | | |
|---|---|---|---|
| 5,738,817 | A | 4/1998 | Danforth et al. |
| 5,764,521 | A | 6/1998 | Batchelder et al. |
| 6,085,957 | A | 7/2000 | Zinniel et al. |
| 6,129,872 | A | 10/2000 | Jang |
| 6,797,220 | B2 | 9/2004 | Mulligan et al. |
| 7,387,757 | B2 | 6/2008 | Mulligan et al. |
| 8,192,664 | B2 | 6/2012 | Polk, Jr. et al. |
| 2002/0165304 | A1 | 11/2002 | Mulligan et al. |
| 2003/0232176 | A1 | 12/2003 | Polk, Jr. et al. |
| 2004/0238999 | A1 | 12/2004 | Mulligan et al. |
| 2004/0241386 | A1 | 12/2004 | Polk, Jr. et al. |
| 2008/0099953 | A1 | 5/2008 | Fork et al. |

(Continued)

OTHER PUBLICATIONS

"Printing Lampshades With a Makerbot", http://blog.makerbot.com/2010/09/03/lampshades/ Sep. 3, 2010, 5 pages.

(Continued)

*Primary Examiner* — Joseph S Del Sole
*Assistant Examiner* — Thu Khanh T Nguyen
(74) *Attorney, Agent, or Firm* — Strategic Patents, P.C.

(57) ABSTRACT

An additive three-dimensional fabrication process is improved by controlling deposition rate to obtain surface textures or other surface features below the nominal processing resolution of fabrication hardware. Sub-resolution information may be obtained, for example, from express metadata (such as for surface texture), or by interpolating data from a source digital model.

10 Claims, 7 Drawing Sheets

(56) References Cited

U.S. PATENT DOCUMENTS

2012/0211919 A1    8/2012  Polk, Jr. et al.
2013/0009338 A1    1/2013  Mayer
2014/0070445 A1    3/2014  Mayer

OTHER PUBLICATIONS

USPTO, "U.S. Appl. No. 13/176,113 Non-Final Office Action dated Mar. 14, 2013", 16 pages.
USPTO, "U.S. Appl. No. 13/176,113 Notice of Allowance dated Aug. 5, 2013", 10 pages.
USPTO, "U.S. Appl. No. 14/016,269 Non-Final Office Action dated Apr. 9, 2015", 10 pages.
USPTO, "U.S. Appl. No. 14/016,269 Notice of Allowance dated Oct. 9, 2015", 7 pages.

THREE-DIMENSIONAL SURFACE TEXTURING

RELATED APPLICATIONS

This application is a continuation of U.S. patent application Ser. No. 14/016,269 filed Sep. 3, 2013, which is a continuation of U.S. patent application Ser. No. 13/176,113 filed Jul. 5, 2011 (now U.S. Pat. No. 8,529,240). The entire content of each of the foregoing applications is hereby incorporated by reference.

BACKGROUND

In an additive three-dimensional fabrication system, a physical object can be realized from a digital model by depositing successive layers of a build material that accumulate to provide the desired form. Certain additive techniques render each layer as a single, continuous path of an extruded material, typically completing a layer of the object in an x-y plane and then stepping to a next z position (or height) for each subsequent cross-sectional plane, all under computer control.

Techniques such as partial stepping or micro-step driving have been devised to increase spatial resolution for stepper motors typically used to control x-y positioning in such additive techniques. However, there remains a need for additive fabrication techniques that permit independent application of surface texture and other surface features, in particular small or sub-pixel features, to a model during fabrication.

SUMMARY

An additive three-dimensional fabrication process is improved by controlling deposition rate to obtain surface textures or other surface features below the nominal processing resolution of fabrication hardware. Sub-resolution information may be obtained, for example, from express metadata (such as for surface texture), or by interpolating data from a source digital model.

BRIEF DESCRIPTION OF THE FIGURES

The invention and the following detailed description of certain embodiments thereof may be understood by reference to the following figures.

DETAILED DESCRIPTION

All documents mentioned herein are hereby incorporated in their entirety by reference. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus the term "or" should generally be understood to mean "and/or" and so forth.

Figure 1:
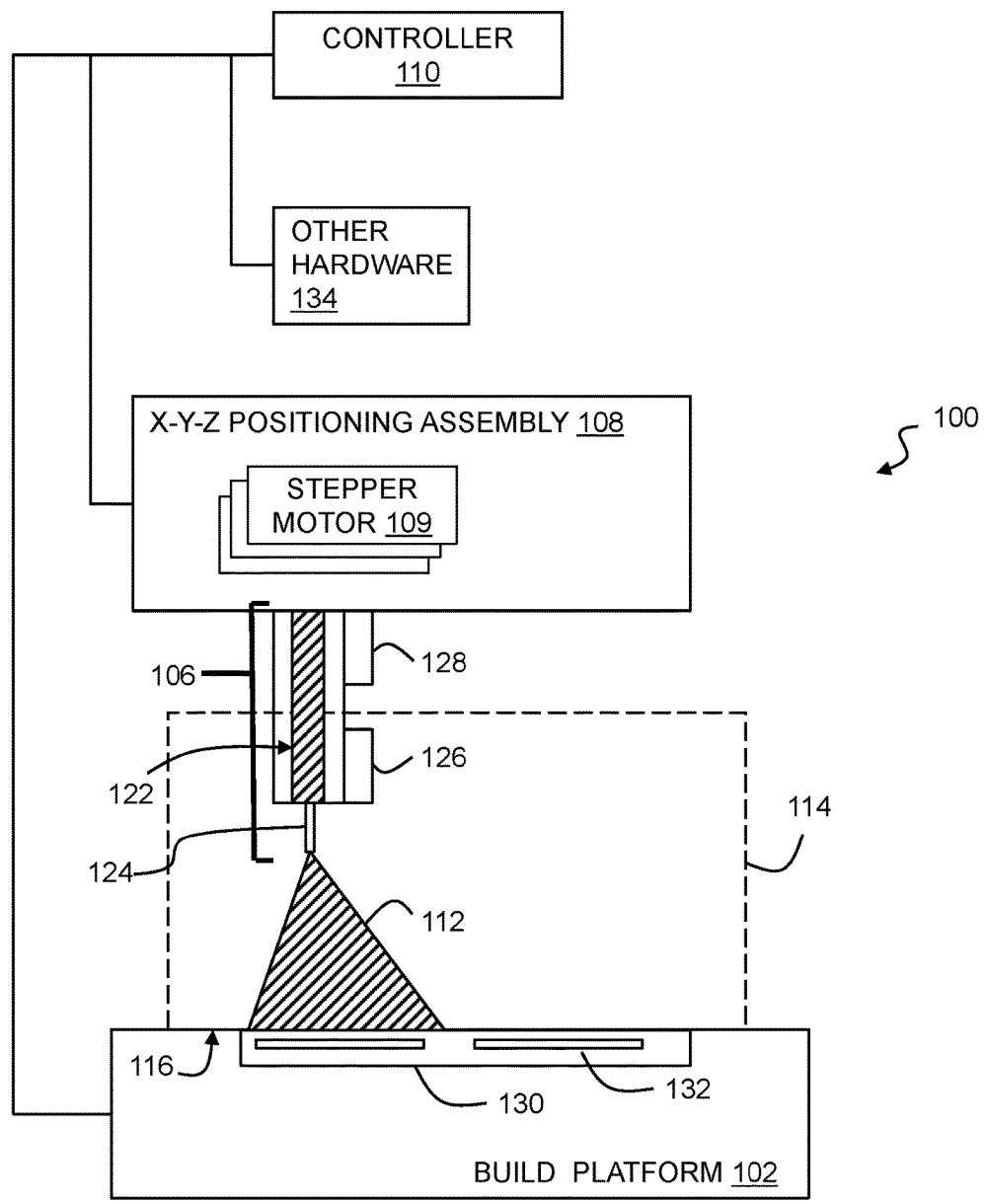
FIG. 1 is a block diagram of a three-dimensional printer.

FIG. 1 is a block diagram of a three-dimensional printer. In general, the printer 100 may include a build platform 102, an extruder 106, an x-y-z positioning assembly 108, and a controller 110 that cooperate to fabricate an object 112 within a working volume 114 of the printer 100.

The build platform 102 may include a surface 116 that is rigid and substantially planar. The surface 116 may provide a fixed, dimensionally and positionally stable platform on which to build the object 112. The build platform 102 may include a thermal element 130 that controls the temperature of the build platform 102 through one or more active devices 132 such as resistive elements that convert electrical current into heat, Peltier effect devices that can create a heating or cooling affect, or any other thermoelectric heating and/or cooling devices. The heating element 130 may be coupled in a communicating relationship with the controller 110 in order for the controller 110 to controllably impart heat to or remove heat from the surface 116 of the build platform 102.

The extruder 106 may include a chamber 122 in an interior thereof to receive a build material. The build material may, for example, include acrylonitrile butadiene styrene ("ABS"), high-density polyethylene ("HDPL"), polylactic acid, or any other suitable plastic, thermoplastic, or other material that can usefully be extruded to form a three-dimensional object. The extruder 106 may include an extrusion tip 124 or other opening that includes an exit port with a circular, oval, slotted or other cross-sectional profile that extrudes build material in a desired cross-sectional shape.

The extruder 106 may include a heater 126 to melt thermoplastic or other meltable build materials within the chamber 122 for extrusion through an extrusion tip 124 in liquid form. While illustrated in block form, it will be understood that the heater 126 may include, e.g., coils of resistive wire wrapped about the extruder 106, one or more heating blocks with resistive elements to heat the extruder 106 with applied current, an inductive heater, or any other arrangement of heating elements suitable for creating heat within the chamber 122 sufficient to melt the build material for extrusion. The extruder 106 may also or instead include a motor 128 or the like to push the build material into the chamber 122 and/or through the extrusion tip 124.

In general operation (and by way of example rather than limitation), a build material such as ABS plastic in filament form may be fed into the chamber 122 from a spool or the like by the motor 128, melted by the heater 126, and extruded from the extrusion tip 124. By controlling a rate of the motor 128, the temperature of the heater 126, and/or other process parameters, the build material may be extruded at a controlled volumetric rate. It will be understood that a variety of techniques may also or instead be employed to deliver build material at a controlled volumetric rate, which may depend upon the type of build material, the volumetric rate desired, and any other factors. All such techniques that might be suitably adapted to delivery of build material for fabrication of a three-dimensional object are intended to fall within the scope of this disclosure.

The x-y-z positioning assembly 108 may generally be adapted to three-dimensionally position the extruder 106 and the extrusion tip 124 within the working volume 114. Thus by controlling the volumetric rate of delivery for the build material and the x, y, z position of the extrusion tip 124, the object 112 may be fabricated in three dimensions by depositing successive layers of material in two-dimensional patterns derived, for example, from cross-sections of a computer model or other computerized representation of the object 112. A variety of arrangements and techniques are known in the art to achieve controlled linear movement along one or more axes. The x-y-z positioning assembly 108 may, for example, include a number of stepper motors 109 to independently control a position of the extruder within the working volume along each of an x-axis, a y-axis, and a z-axis. More generally, the x-y-z positioning assembly 108 may include without limitation various combinations of stepper motors, encoded DC motors, gears, belts, pulleys, worm gears, threads, and so forth. Any such arrangement suitable for controllably positioning the extruder 106 within the working volume 114 may be suitably adapted to use with the printer 100 described herein.

In general, this may include moving the extruder 106, or moving the build platform 102, or some combination of these. Thus it will be appreciated that any reference to moving an extruder relative to a build platform, working volume, or object, is intended to include movement of the extruder or movement of the build platform, or both, unless a more specific meaning is explicitly provided or otherwise clear from the context. Still more generally, while an x, y, z coordinate system serves as a convenient basis for positioning within three dimensions, any other coordinate system or combination of coordinate systems may also or instead be employed, such as a positional controller and assembly that operates according to cylindrical or spherical coordinates.

The controller 110 may be electrically coupled in a communicating relationship with the build platform 102, the conveyer 104, the x-y-z positioning assembly 108, and the other various components of the printer 100. In general, the controller 110 is operable to control the components of the printer 100, such as the build platform 102, the x-y-z positioning assembly 108, and any other components of the printer 100 described herein to fabricate the object 112 from the build material. The controller 110 may include any combination of software and/or processing circuitry suitable for controlling the various components of the printer 100 described herein including without limitation microprocessors, microcontrollers, application-specific integrated circuits, programmable gate arrays, and any other digital and/or analog components, as well as combinations of the foregoing, along with inputs and outputs for transceiving control signals, drive signals, power signals, sensor signals, and so forth.

A variety of additional sensors and other components may be usefully incorporated into the printer 100 described above. These other components are generically depicted as other hardware 134 in FIG. 1, for which the positioning and mechanical/electrical interconnections with other elements of the printer 100 will be readily understood and appreciated by one of ordinary skill in the art. The other hardware 134 may include a temperature sensor positioned to sense a temperature of the surface of the build platform 102 or any other system components. This may, for example, include a thermistor or the like embedded within or attached below the surface of the build platform 102. This may also or instead include an infrared detector or the like directed at the surface 116 of the build platform 102 or the sheet 118 of material of the conveyer 104.

In another aspect, the other hardware 134 may include a sensor to detect a presence of the object 112 at a predetermined location. This may include an optical detector arranged in a beam-breaking configuration to sense the presence of the object 112 at a predetermined location. This may also or instead include an imaging device and image processing circuitry to capture an image of the working volume and to analyze the image to evaluate a position of the object 112. This sensor may be used for example to ensure that the object 112 is removed from the build platform 102 prior to beginning a new build on the working surface 116. Thus the sensor may be used to determine whether an object is present that should not be, or to detect when an object is absent. The feedback from this sensor may be used by the controller 110 to issue processing interrupts or otherwise control operation of the printer 100. In another aspect, the sensor may include a heater (instead of or in addition to the thermal element 130) to heat the working volume such as a radiant heater or forced hot air heater to maintain the object 112 at a fixed, elevated temperature throughout a build.

In general, the above system can build a three-dimensional object by depositing lines of build material in successive layers—two-dimensional patterns derived from the cross-sections of the three-dimensional object. As described below, a deposition rate during this process may be varied using a variety of techniques to impart a surface texture or other structures or features to outside surfaces of the three-dimensional object. The following description begins with a generalized software architecture for three-dimensional fabrication using the systems described above, and continues with specific methods for varying a deposition rate to achieve a non-uniform surface texture or other surface feature during fabrication of an exterior surface of the three-dimensional object.

It will be understood that all surfaces are non-uniform in some sense, and that any fabrication process has physical. The phrase "non-uniform surface texture" as used herein is intended to refer to those patterns, features, or structures that depart from ordinary process variations achieved in a "uniform surface texture" obtained from a constant-deposition-rate fabrication process that assumes a non-varying volumetric delivery rate for build material. By varying the volumetric rate of delivery of build material to deposit more or less build material at a given location than otherwise would have been deposited, intentional irregularities can be obtained, and more specifically controlled to provide sub-pixel features or surface textures. Thus non-uniform surface textures or features may be identified as those features smaller than a nominal processing resolution of a fabrication system, but larger than features or characteristics resulting from random or otherwise uncontrolled process variability. In the context of three-dimensional fabrication as contemplated herein, sub-pixel features may similarly be understood to be any features processed or reproduced in x-y increments within the plane of a build platform smaller than the nominal step size of the fabrication system, or otherwise smaller than the smallest discretely addressable position intervals of the fabrication system, particularly in the x-y plane.

Non-uniform features as generally contemplated herein may be used to apply a desired surface texture to a three-dimensional object. In other aspects, such non-uniform features may be used to control other aspects of an object, such as a coefficient of friction on the surface of the object or light transmission through the object.

In one aspect, this capability may be applied, e.g., on an angled surface, to achieve surfaces that or more uniform or planar than would be obtained in the "uniform" surface of an unmodified process. Thus the term "non-uniform" as used herein may be best understood in certain circumstances to mean "including features smaller than the nominal processing resolution of a fabrication system," which features are readily structurally identifiable to one of ordinary skill in the art.

Figure 2:
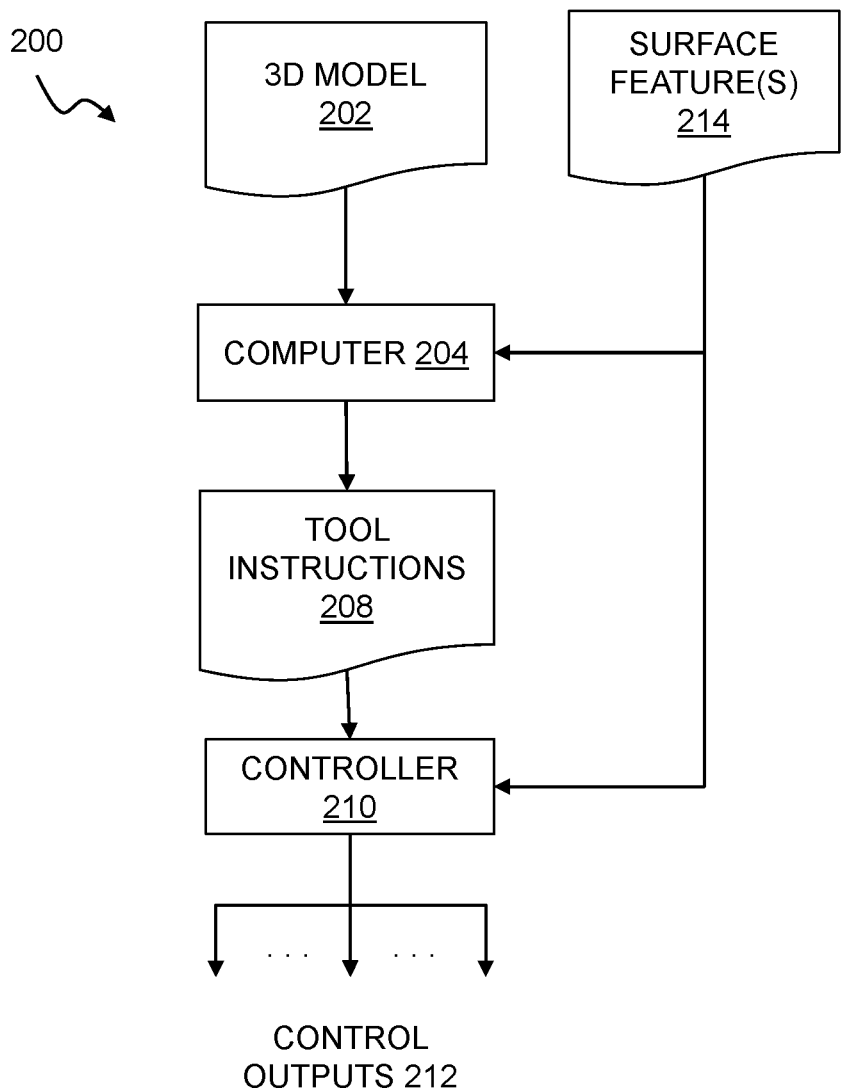
FIG. 2 is a block diagram of a controller architecture for a three-dimensional printer.

FIG. 2 is a block diagram of a controller architecture for a three-dimensional printer. In general, a three-dimensional model is converted into a sequence of tool instructions, typically including a line model that can be sent to a controller for execution on a fabrication platform such as that described above.

A model 202 of an object such as any of the three-dimensional objects 112 described above may be stored as a computer-aided design (CAD) model or other three-dimensional representation using any open or proprietary format. The model may, for example, include a wireframe representation, solid modeling representation, surface modeling representation, point cloud, or the like. Numerous data formats and three-dimensional modeling tools are known in the art, any of which may be suitably adapted to use for creating and storing the model 202.

The model may be provided to a computer 204, which may be any general purpose or special purpose computing device including, e.g., a processor, memory, and one or more data or network interfaces or other input/output ports. The computer may convert the model 202 in accordance with computer code running on the computer 202 to obtain a representation of the model 202 suitable for fabrication. In one aspect, this may include multiple steps such as conversion to a standard format such as the widely used stereolithography (STL) file format created by 3D Systems. The model 202, or the standard format representation of the model 202, may be further processed to obtain tool instructions 208 for a controller 210 such as the controller 110 described above. In one aspect, the tool instructions 208 may include g-code or any other computer numerical control programming language or other description suitable for execution by the controller 210. In one relevant aspect, g-code or other similar tool instructions include a tool path that characterizes a physical path in three-dimensional space traversed by a tool such as the x-y-z positioning assembly 108 and extruder 106 described above. More specifically, the tool path may include a line model of an object for fabrication, which spans that portion of the tool path during which the tool extrudes material to form the object. The tool instructions 208 may represent the line model as a sequence of directions, a sequence of locations, a sequence of starting and ending locations, or any other suitable representation. However formulated, the tool instructions 208 including the line model may be transmitted to the controller 210 for execution.

The controller 210, which may receive the tool instructions 208 as a stream of instructions or as a file for local execution or in any other suitable form, may interpret the tool instructions 208 and generate control outputs 212 directing the various aspects of a fabrication system such as the printer 100 described above to produce a physical realization of the object described in the model 202. The control outputs 212 may include analog control outputs, digital control outputs, or the like.

The model 202 may include, or may be processed to derive, one or more surface features 214 of the object, or a user may specify such surface features 214 independently from the object described by the model 202. However derived, these surface features 214 may be used by the computer 204 in preparing tool instructions 208. This may include incorporating the surface features 214 into the line model or tool path where appropriate, or creating metadata for the tool instructions 208 so that the controller 210 can apply the surface features 214 consistent with its own capabilities. In another aspect, the surface features 214 may be sent directly to the controller 210 for handling independent of the tool instructions 208. As discussed above, features within the processing resolution of the fabrication platform (including the controller 210) may simply be incorporated into the tool instructions 208 for execution by the controller 210. However, features below the processing resolution (which may be measured using any suitable metric such as a minimum feature dimension, a minimum tool path step, a minimum volume of build material, a minimum x-y resolution, and so forth) may still be reproduced by the fabrication platform using the techniques discussed herein. In particular, the controller 210 may identify surfaces of the model 202, identify one or more corresponding surface features 214 (which may be location dependent or location independent), and modify the tool instructions 208 during fabrication to obtain the desired surface features 214 on a physical model fabricated from the model 202.

The surface features 214 may include any of a variety of structures, features, or the like. In one aspect, the surface features 214 may provide a general description of surface texture such as smooth, rough, wavy, undulating, and so forth, along with an identification of where on a surface of the object the surface feature appears. The surface feature 214 may be physically modeled as a bit map or voxel representation, or as a more general representation that can be scaled, rotated, or otherwise modified to achieve a desired feature or texture. In one aspect, a variety of surface textures or features may be provided for selection and placement by a user. More generally, a variety of types of surface features 214, and representations of same, may be suitably adapted to the uses contemplated herein. In some embodiments, the tool instructions may include information allowing for later calculation of surface features by a controller. This information may, without limitation, include surface identifiers relating lines in a tool path to surfaces in the model 202, such as exterior surfaces, interior surfaces, and so on. The information may also or instead include texture identifiers that identify surface features with reference to base textures, texture models, texturing parameters (magnitude, rotation, scaling, etc.). This information may further include data used in texture mapping the base textures to the surfaces (e.g., data for registering/orienting the texture map to the surface, and so on). In embodiments, the texture maps may include two-dimensional texture maps, three-dimensional texture maps, tessellations, smoothing or anti-aliasing patterns/filters, and so on.

It will be understood that, while FIG. 2 depicts surface textures as data external to a model, the surface texture may be included within object data for the model, or may be inferred from the model itself, all without departing from the scope of this disclosure. Regardless of how or where obtained, the surface feature 214 may be realized in a physical object fabricated by a three-dimensional printer or the like.

When surface texture information is available, either within the tool instructions or independent of the tool instructions, the controller 110 may adjust or adapt the tool instructions accordingly to achieve the intended surface texture, such as by including an instruction to decrease or increase a feed rate for build material or a temperature of a heating chamber, or by moving a deposition tool such as the extruder 106 described above within a z axis to vary the rate at which build material is deposited.

Logic for calculating the variations in a deposition rate during a fabrication process may be implemented in firmware, software, hardware, or the like on the controller 210. Thus while the controller 210 may generally operate to extrude a build material at a constant deposition rate (or volumetric flow rate) while moving an extruder in an x-y pattern according to the tool instructions 208 from the computer 204, the controller 210 may also reference surface features 214 to additionally determine when and where to vary from a predetermined, constant deposition rate in the tool instructions 208. These variations in deposition rate during the build process may be applied to obtain variations in the surface texture to obtain a physical realization of the model 202 that includes the surface features 214. Thus in one aspect, the fabrication of surface textures or other surface features as contemplated herein may be readily recognized by the addition or modification of controller instructions to interpolate, filter, vary, or otherwise modify tool instructions for a constant-deposition-rate fabrication process.

In another aspect, these and similar techniques may be applied to achieve sub-pixel resolution in a fabrication process. For example, a tool path in the tool instructions 208 may be represented as a straight line. Where this line is angled to an x-y coordinate system used to control a tool such as an extruder, the deposition rate may be varied to partially fill step discontinuities between discrete, adjacent x or y coordinates within the tool path. A variety of sub-pixel processing and rendering techniques are known in the art of two-dimensional printing such as interpolation, anti-aliasing, and low-pass filtering, many of which may be readily adapted to use with the systems and methods described herein.

Figure 3:
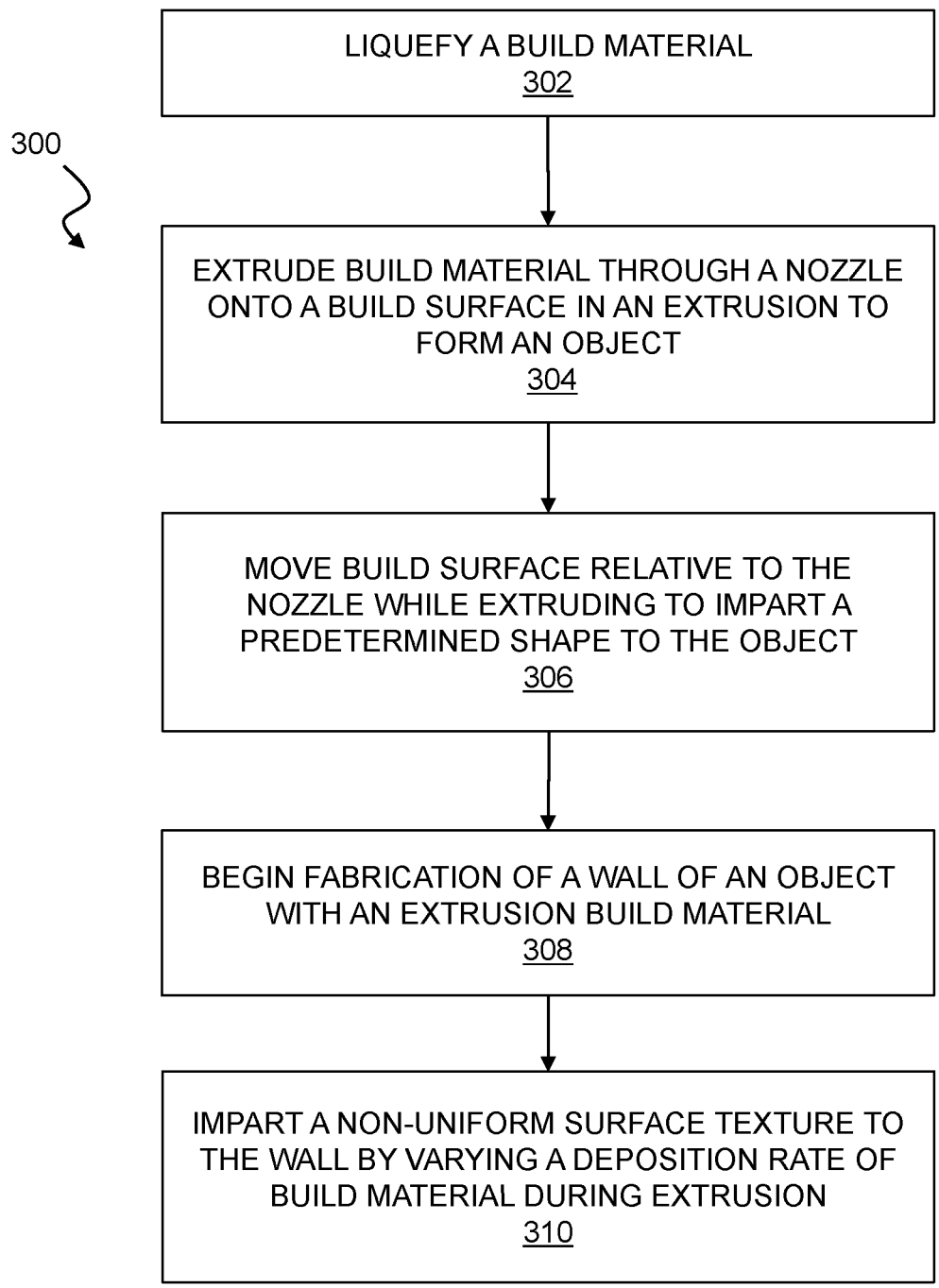
FIG. 3 is a flowchart of a process for imparting surface texture to a three-dimensional object.

FIG. 3 is a flow chart of a process for imparting surface texture to a three-dimensional object. In general, a three-dimensional object may be fabricating using the printer 100 described above or any similar system. During this process, modifications may be implemented as described below to impose a desired, predetermined surface texture on an object during fabrication.

As shown in step 302, the process 300 may begin with liquefying a build material. This may be any liquefiable material such as a thermoplastic or the like. It will be understood that some useful build materials do not require liquefication, and may be curable or otherwise treatable after extrusion to achieve desired structural and/or aesthetic properties. Thus this step is optional, and depends upon the type of build material being used in a three-dimensional fabrication process.

As shown in step 304, the liquefied build material may be extruded through a nozzle of an extruder onto a build surface in an extrusion to form an object. This may be a liquefied build material, or any other suitable build material as noted above.

As shown in step 306, the build surface may be moved relative to the extruder (or nozzle thereof) during the extrusion as generally described above to impart a predetermined shape, such as from a computer model or the like, to the object.

As shown in step 308, the process 300 may include fabricating an exterior wall or other portion of the object with the extrusion of the build material. This may include fabrication using any of the techniques described above. It will be understood that the exterior wall may be detected using a variety of techniques. For example, numerous algorithms are known for identifying surfaces of volumetric models, any of which may be applied to identify exterior walls automatically. An exterior wall may also or instead be explicitly labeled in the surface feature data, so that a controller can detect the exterior surface with a flag or the like within the tool instructions. In this aspect, it will be understood that manual identification of "exterior" walls may also be used to flag interior walls or structures where greater control of extrusion is desired.

While the description herein focuses on the texture or shape of surface features imposed on an object, it will be appreciated that the improved control provided by the techniques disclosed herein may be applied to obtain other benefits. For example, by varying the thickness of an exterior wall, the light-transmissive properties may be controlled to achieve desirable aesthetic qualities such as by embedding patterns or designs in an exterior wall that are visible when the exterior wall is backlit. This technique may be applied to fabricate, e.g., an ornamental lamp shade or similar device with a light-transmissive design.

As shown in step 310, the process 300 may include varying a deposition rate of build material during extrusion to impart a non-uniform surface texture to the exterior wall. As generally described above, the non-uniform surface texture may be a predetermined surface texture having one or more sub-pixel features relative to the process used for fabrication.

It will be understood that the deposition rate may be varied using a number of different techniques. For example, in one aspect a build material feed rate may be varied by controlling the speed of a drive motor or similar mechanism that supplies a filament of build material to an extruder. As the feed rate or motor speed is increased, the deposition rate will increase, and as the feed rate (or motor speed) is decreased, the deposition rate will decrease. This approach in particular permits extended periods of increase or decrease without requiring an offsetting, opposing action to return to the constant deposition rate. By contrast, other techniques such as increasing temperature (where materials and thermal control permit) or temporarily changing a z-axis position of the extruder or build platform, would generally require a complementary, offsetting parameter change to return the system to a normal, constant-deposition-rate process. This limitation is mitigated where the change in deposition rate is periodic in nature. That is, where the variation in deposition rate is sinusoidal or otherwise varies in a manner for which the rate of deposition integrates to the constant rate (or stated differently, with zero net change in deposition rate), the need to actively recover the constant deposition rate (e.g., by a complementary, opposing step in z-axis position) may be mitigated or eliminated.

In another aspect, temperature of a heater or the like may similarly be varied. By increasing the heat applied to a liquefiable material such as a thermoplastic, the rate of deposition may be increased as the less viscous material flows more quickly from an extruder. Similarly, a decrease in heat may slow the extrusion of material. As noted above, such variations may be periodic in nature to avoid processing difficulties from an otherwise constant feed supply rate such as overfilling a melting chamber or underfilling to cause a discontinuity in the supply of build material. As another example, the z-axis position may be temporarily increased or decreased where the system allows, to cause an increase in the deposition rate (as an extruder moves closer to a build platform) or a decrease in the deposition rate (as the extruder moves away from the build platform). In yet another aspect, the rate of x-y movement or horizontal velocity of the build platform relative to the extruder may be varied to achieve changes in deposition rate under control of the controller.

It will readily be appreciated that two or more parameters (e.g., temperature and feed rate) may be varied concurrently to control the deposition rate of a build material. Additionally, it will be understood that certain controls may exhibit a significant latency. So, for example, increasing the temperature may be limited by thermal capacitance of the heating components, and there may be a significant lag (relative to a time step used by the controller) before the change in temperature yields a change in deposition rate. Such latency may be determined empirically or experimentally, or estimated using physical or statistical modeling, or otherwise determined so that the controller issues instructions to the extruder and/or build platform in a manner suitably synchronized to the fabrication process to obtain surface features at the desired location(s) within an object.

As noted above, the surface texture may be specified in numerous ways. This may include sub-pixel interpolation of a computer model as noted above. This may also or instead include use of pre-defined surface textures based upon, e.g., sinusoidal functions, step functions, triangle functions, square functions, and so forth. In addition to describing such surface textures in a particular two-dimensional layer of a build, a surface texture may define an offset or the like from layer to layer so that a periodic or other variation can be shifted in the x-y plane with successive z-axis steps. Thus the surface texture may include two-dimensional features that are aligned, misaligned, staggered or otherwise arranged from layer to layer. Similarly, the surface texture may apply different patterns or functions in each two-dimensional layer to achieve a desired surface texturing effect.

More generally, varying the deposition rate may include any and all techniques for varying how much material is deposited in a particular area. Thus, the phrase "varying the deposition rate" as used herein is intended to include literally varying the rate at which build material exits the extruder, as well as other variations causing a change in the time wise amount of material deposited on an object such as a change in the velocity of an extrusion head relative to a build platform, as well as any combination of the these or other controllable parameters that affect the quantity of material deposited in a particular area over a particular period of time.

Figure 4:
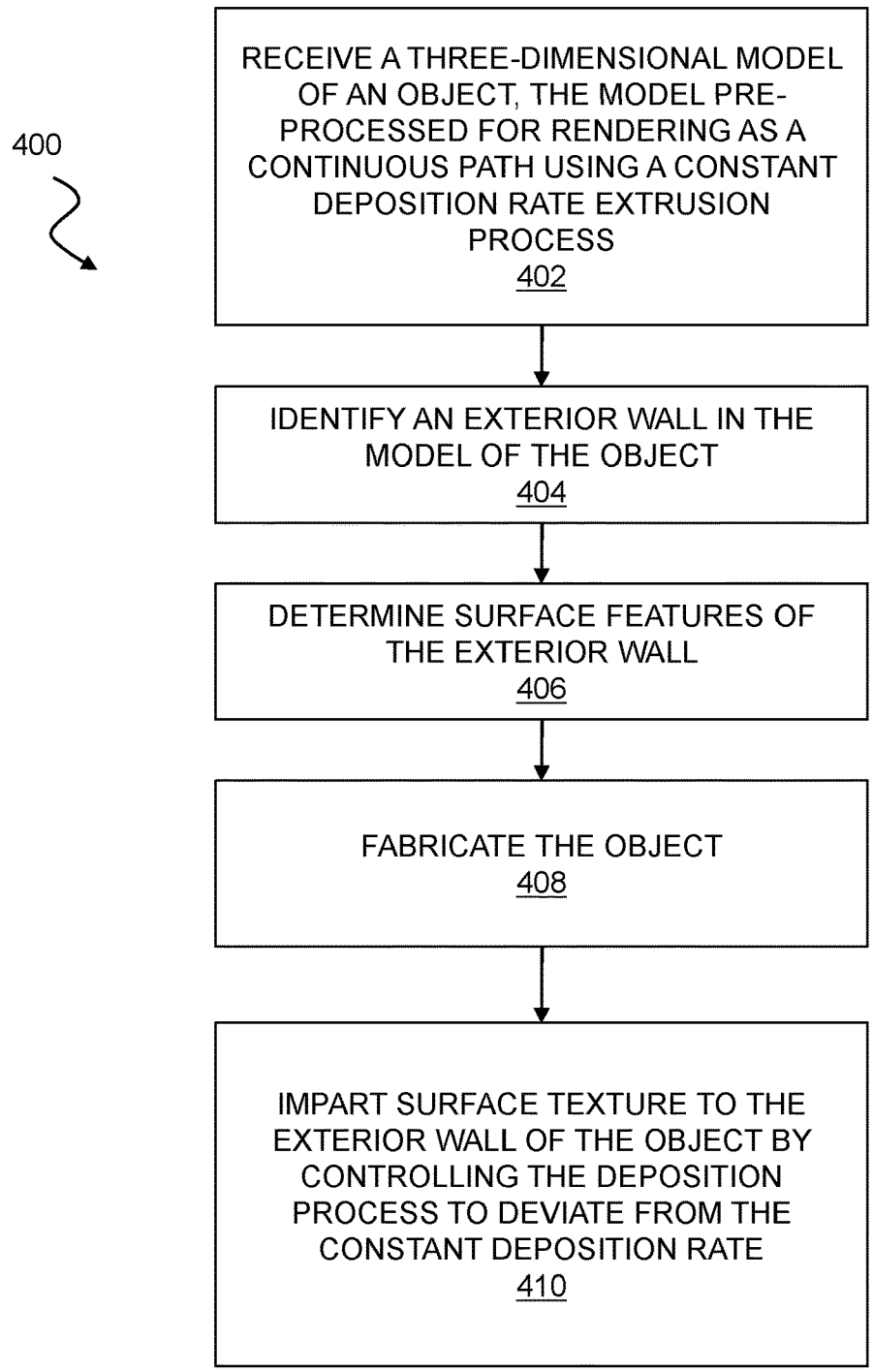
FIG. 4 is a flowchart of a process for fabricating an object with sub-pixel surface features.

FIG. 4 is a flowchart of a process for fabricating an object with sub-pixel surface features.

As shown in step 402, the process 400 may begin with receiving a three-dimensional model of an object that has been pre-processed for rendering as a continuous path in an extrusion process that uses a constant deposition rate. This may, for example, include the creation of tool instructions from a digital model as generally described above, including without limitation a tool path followed by an extruder while depositing material to build the object. In general, pre-processing in this manner includes selecting a number of operating parameters such as feed rate, temperature, x and y step sizes, and the like, which may be selected explicitly through a user interface, or implicitly by software supporting a fabrication system, and calculating a path through a series of two-dimensional layers that can be used to fabricate the object. The details of tool path creation are well known in the art and embodied in software and fabrication systems that are commercially available, and as such, the details of generating tool instructions are not set forth in detail here.

As shown in step 404, the process 400 may include identifying an exterior wall in the three-dimensional model of the object. As noted above, this may include any suitable automated or manual process or combination of these, and may for example include identifying non-exterior walls as exterior walls for purposes of sub-pixel feature fabrication. The phrase "exterior wall" as used herein should be understood to include all such regions of the model and/or object fabricated from the model.

As shown in step 406, the process may include determining surface features of the exterior wall. This may include identifying small (e.g., sub-pixel) features from a digital model that are not captured in a tool path, such as surface details or an interpolation of lines or other geometric features from the digital model. This may also or instead include a selection of a generalized surface texture for a region of the exterior wall as described above. It will be understood that in certain circumstances, the surface features may include features larger than a nominal x-y processing resolution of a fabrication system, that is, capable of reproduction without independent control of a deposition rate as described herein. Nonetheless, such surface features may be usefully modeled and fabricated as a characteristic independent of the digital model.

As shown in step 408, a three-dimensional fabrication system may fabricate the object of the digital model using a tool path and/or other tool instructions.

As shown in step 410, during the fabrication of step 408, a surface texture may be imparted to the exterior wall of the object by controlling the deposition process to deviate from the constant deposition rate. Stated differently, the deposition rate may vary in response to surface features detected by the controller during deposition, which variations may be independent of a tool path dictated by a source digital model. Such variations may in general be represented in a variety of forms, and may be realized using a variety of techniques, all as discussed above.

This may, for example, include elements or features smaller than a resolution of the deposition process, such as an x-y resolution or other nominal step size or controlled increment of fabrication. This may also or instead include an overall surface texture for the exterior wall based upon a mathematical model (e.g., sinusoid, triangle wave, etc.), bitmapped surface, or any other source.

Figure 5:
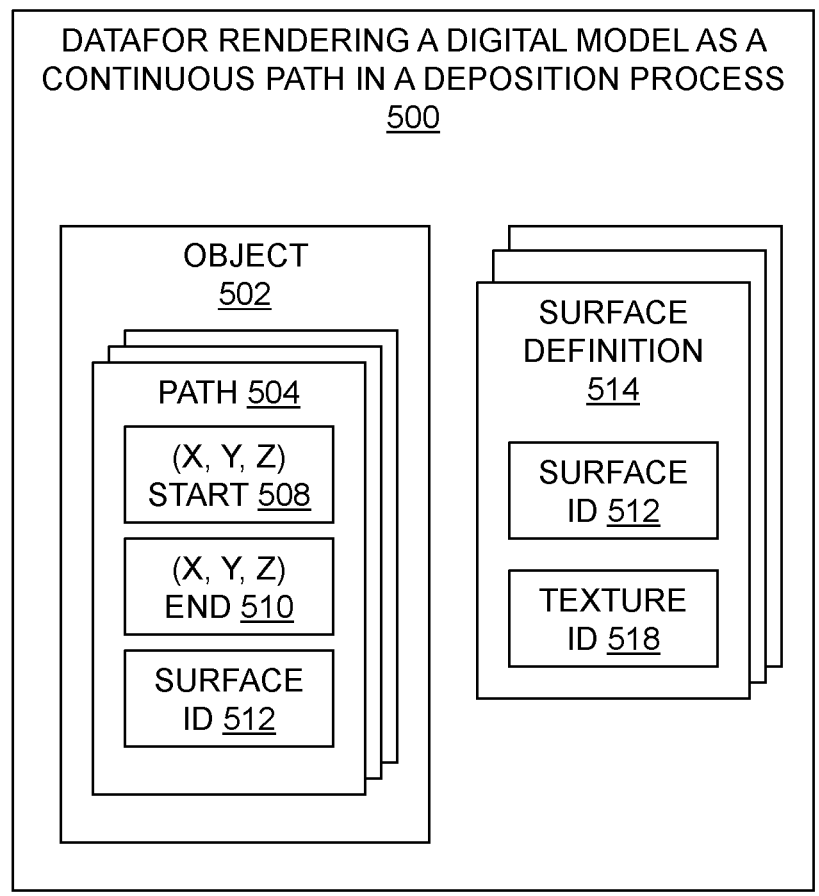
FIG. 5 is a block diagram of a data structure describing an object for three-dimensional fabrication.

FIG. 5 is a block diagram of a data structure describing an object for three-dimensional fabrication. In general, the data structure 500 may include a description of an object 502 that has been pre-processed for rendering as a continuous path in a deposition process based upon, e.g., an extrusion at a constant deposition rate, along with a surface definition 514 of one or more surface features for the object 502.

The description of the object 502 may include any of a variety of tool instructions that specify parameters such as temperature, feed motor speed, and any other controllable parameters for a fabrication platform such as the printer 100 described above. The instructions may more particularly include a tool path 504 including a number of start 508 and end 510 coordinates in x-y-z space that characterize a path traversed by a tool such as an extruder during fabrication of the object. Typically, the z coordinate remains constant while a two-dimensional line is rendered in the x-y plane, however, any combination or sequence of coordinates within the processing capability of the fabrication platform may be used to define a tool path for rendering an object as contemplated herein. Techniques are well known in the art for converting a three-dimensional object model into a tool path that includes sequential layers of two-dimensional patterns, and software (either open source or proprietary) is commercially available for performing this function. As such, the details of a conversion from a digital model to a tool path are not described in detail here.

In addition, the description of the object 502 may include a surface identifier 512 or other metadata that flags a particular line or line segment in the tool path 504 as belonging to an exterior wall. It should be noted that this data is optional. Rather than explicitly labeling surfaces, exterior surfaces and the like may be inferred by a controller that receives the description of the object 502 based on, e.g., analysis of the tool path 504 or a comparison of the tool path 504 to an original digital model from which the tool path 504 was obtained.

The surface definition 514 may define surface features or surface texture in any suitable manner. For example, the surface definition 514 may be indexed to the surface identifier 512 of the description of the object 502 so that textures or features can be retrieved and applied on a segment-by-segment basis along the tool path 504. The texture identifier 518 may include a reference to a texture description, such as a mathematical or physical (e.g., bitmapped) representation of a texture, or to one or more tool instructions that vary a deposition rate to achieve a desired feature or texture. In another aspect, the surface definition 514 may be omitted as an explicit description of surface features or textures, and a controller or the like processing the tool path 504 may instead compare the tool path 504 to a source digital model of the object to determine whether and where a deposition rate might be varied to conform the fabrication process to features of the digital model. It will further be appreciated that both of these techniques may be applied in combination, either concurrently or sequentially, without departing from the scope of this disclosure.

Having described systems, methods, and data structures for surface texturing and other sub-pixel rendering techniques in three-dimensional fabrication, a number of examples are now provided of extrusions obtained using these techniques. It will be understood that the drawings of extrusions in the following figures are provided by way of example and for purposes of illustration. These drawings do not limit the scope of this disclosure to any particular relative or absolute dimensions or to any specific features or patterns of extrusion that might be obtained by varying a deposition rate as contemplated herein.

Figure 6:
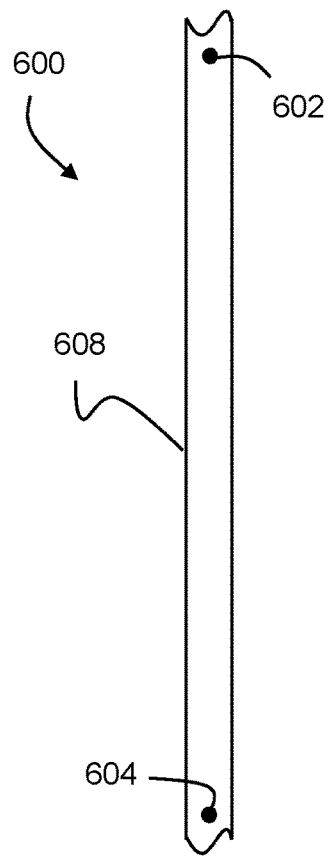
FIG. 6 shows an extrusion of a build material.

FIG. 6 shows an extrusion of a build material. The build material may be any of the materials described above. The extrusion 600 in FIG. 6 is rendered along a straight line of a tool path from a first point 602 to a second point 604 in an x-y plane. The extrusion 600 is rendered without any modification to tool instructions and as such provides a surface 606 with substantially straight walls.

Figure 7:
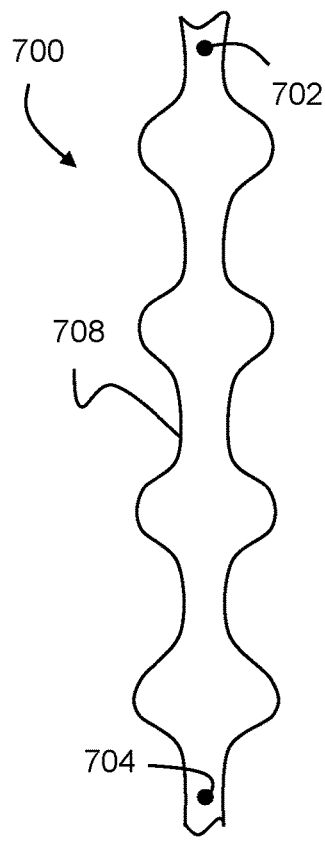
FIG. 7 shows an extrusion of a build material.

FIG. 7 shows an extrusion of a build material. The extrusion 700 is rendered along a straight line of a tool path from a first point 702 to a second point 704. During the extrusion, the deposition rate may be varied according to, e.g., a periodic square wave or similar step function of any desired duty cycle to obtain a surface 708 that includes periodic protrusions. As noted above, these protrusions may be staggered from layer to layer of a fabrication process so that corresponding ridges are oriented diagonally along a surface of a completed object.

Figure 8:
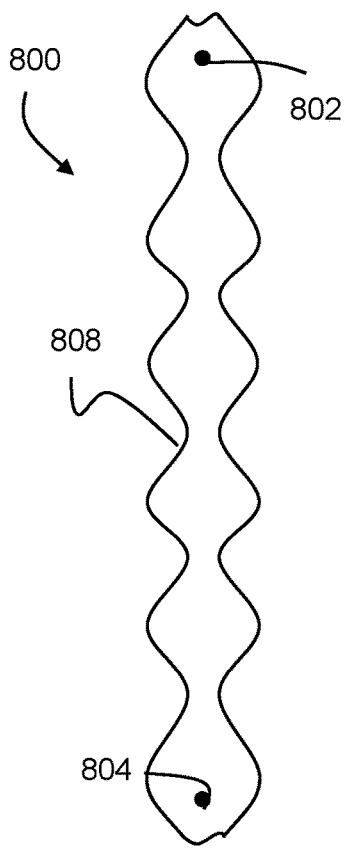
FIG. 8 shows an extrusion of a build material.

FIG. 8 shows an extrusion of a build material. The extrusion 800 is rendered along a straight line of a tool path from a first point 802 to a second point 804. During extrusion, the deposition rate may be varied according to, e.g., a periodic function such as a sinusoid or triangle wave to obtain a surface 808 that is substantially sinusoidal in shape.

Figure 9:
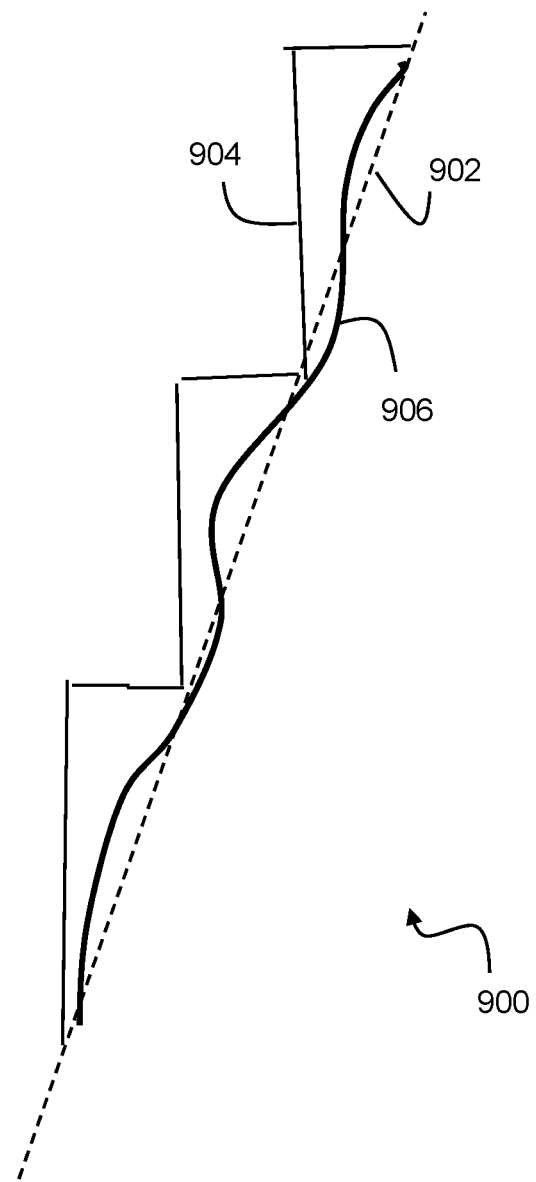
FIG. 9 depicts an exterior wall 900 of an object fabricated from a digital model using a varying deposition rate.

FIG. 9 depicts an exterior wall 900 of an object fabricated from a digital model using a varying deposition rate. The digital model of the exterior wall 900 may have a surface 902 angled to a rectilinear coordinate system of a fabrication platform such as the printer 100 described above. The physical model rendered by a conventional extrusion process with x-y control may have a corresponding surface 904 with a number of straight line segments oriented to the x-y coordinate system of the extruder, resulting in a stair step surface. By varying the deposition rate using, e.g., the techniques described above, a physical model of the exterior wall may be fabricated with a modified surface 906 that more closely matches the digital model. It will be appreciated the modified surface 906 is provided by way of example, and that the actual contours of the modified surface 906 may vary according to the capability of a varying deposition rate process to achieve particular surface features. It will further be appreciated that an interior surface of the physical model may depart significantly from the contours of the digital model, the simple x-y version of the digital model, and the modified surface 906 of the exterior wall 900.

The foregoing techniques may be employed to apply surface texture independent of a digital model, or to render sub-pixel surface features as generally described above. It will be appreciated that modifications of deposition rate (e.g., by a controller to a set of tool instructions for fabricating an object from a digital model) may similarly be applied to a wide array of aesthetic and structural design techniques. For example, these techniques may be applied to vary wall thickness and provide different light transmission properties within a wall of an object. These techniques may also or instead be used to control in-fill within a closed object in order to reduce weight or increase structural support. These techniques may also or instead be applied buttress, fillet, or otherwise add internal and/or external structural features to reinforce an object or portions thereof, or similarly to reduce material deposition to reduce rigidity and provide increase compliance at desired locations within an object. All such variations as would be apparent to one of ordinary skill in the art are intended to fall within the scope of this disclosure.

Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods or processes described above, and steps thereof, may be realized in hardware, software, or any combination of these suitable for a particular application. The hardware may include a general-purpose computer and/or dedicated computing device. The processes may be realized in one or more microprocessors, microcontrollers, embedded microcontrollers, programmable digital signal processors, or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as computer executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

While particular embodiments of the present invention have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A computer program product for controlling operation of a three-dimensional printer to fabricate a three-dimensional object from a computer model, the computer program product comprising computer executable code embodied on a non-transitory computer readable medium that, when executing on one or more computing devices, performs the steps of:
   receiving a three-dimensional model that has been pre-processed for rendering as a continuous path in an extrusion process having a predetermined deposition rate;
   identifying an exterior wall of the three-dimensional model;
   determining a surface feature for the exterior wall including at least one feature smaller than an x-y resolution of the three-dimensional printer;
   fabricating an object based on the three-dimensional model with the extrusion process; and
   controlling the extrusion process to vary the predetermined deposition rate so that the surface feature is imparted to the exterior wall of the object.

2. The computer program product of claim 1 wherein the surface feature is a general surface texture for the exterior wall.

3. The computer program product of claim 1 wherein controlling the extrusion process includes varying the predetermined deposition rate according to a periodic function.

4. The computer program product of claim 3 wherein the periodic function is spatially offset for each of a number of layers of the continuous path.

5. The computer program product of claim 1 further comprising computer executable code that performs the step of pre-processing the three-dimensional model to provide the continuous path.

6. The computer program product of claim 1 wherein controlling the extrusion process includes varying the predetermined deposition rate by moving a build surface relative to a nozzle of the three-dimensional printer while fabricating the object to impart a predetermined shape to the object.

7. The computer program product of claim 6 wherein varying the predetermined deposition rate includes varying a velocity of the build surface in an x-y plane.

8. The computer program product of claim 1 wherein controlling the extrusion process includes varying the predetermined deposition rate by varying an extrusion rate of build material through a nozzle of the three-dimensional printer.

9. The computer program product of claim 1 wherein controlling the extrusion process includes varying the predetermined deposition rate by varying a z-axis distance from a nozzle of the three-dimensional printer to a build surface.

10. The computer program product of claim 1 wherein controlling the extrusion process imparts sub-pixel features of the three-dimensional model onto the exterior wall of the object.

* * * * *